Aug. 5, 1969   E. L. BAILEY   3,459,438
COIL SPRING AND LEVER ACTION AXLE ASSEMBLY
Filed March 20, 1967   2 Sheets-Sheet 1
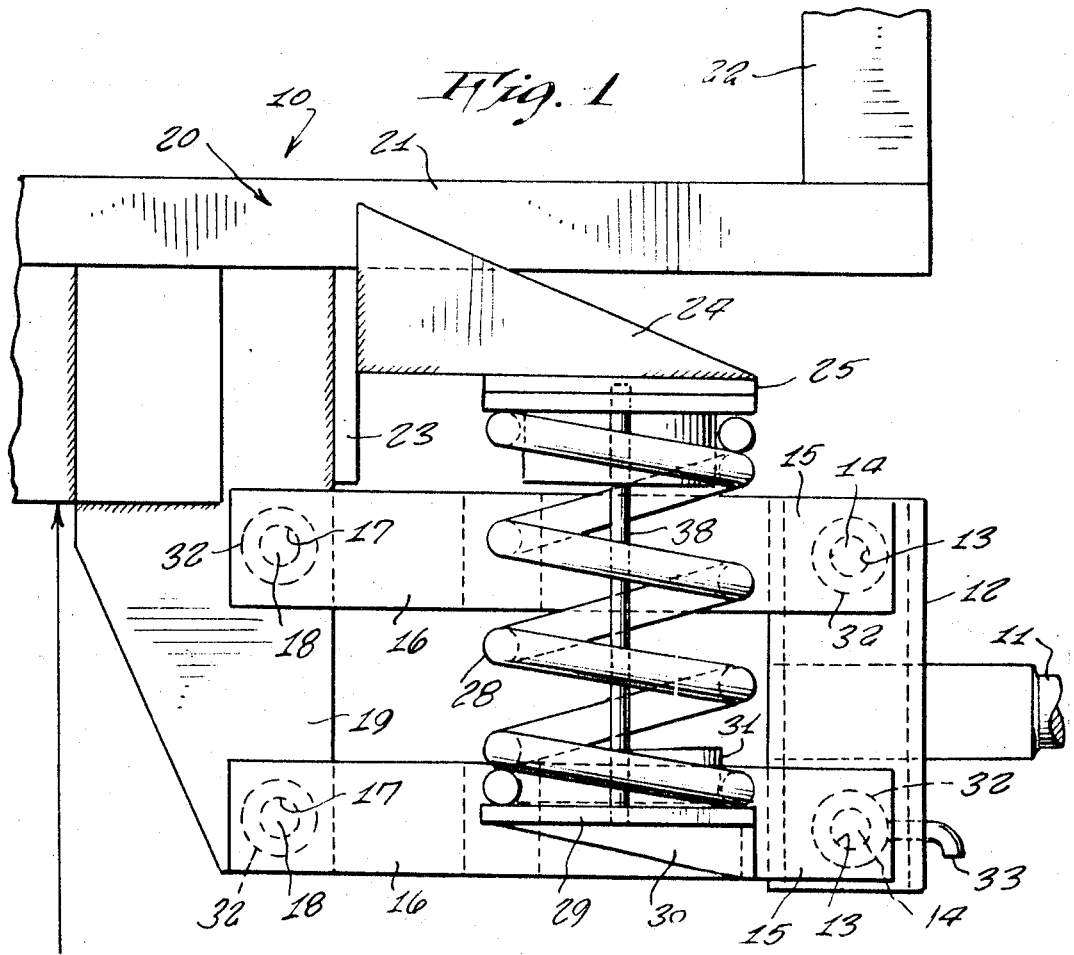
12 INCHES
ROAD
CLEARANCE
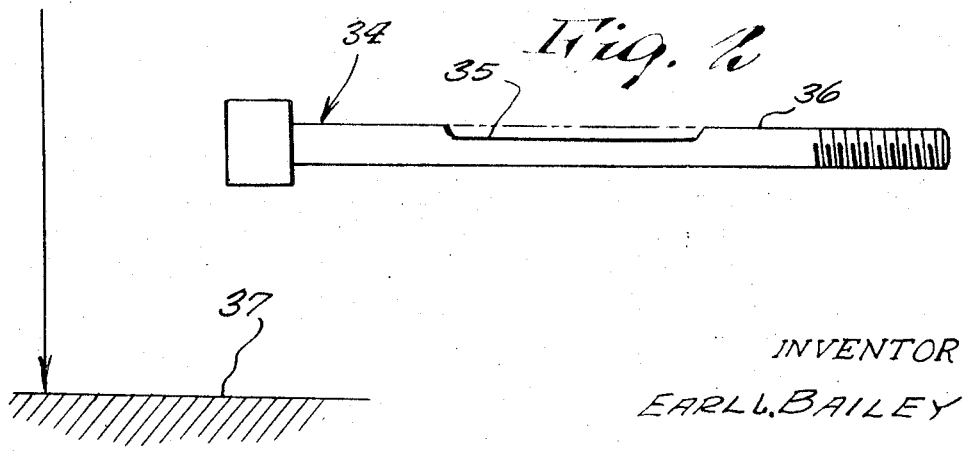
INVENTOR
EARL L. BAILEY Aug. 5, 1969     E. L. BAILEY     3,459,438
COIL SPRING AND LEVER ACTION AXLE ASSEMBLY
Filed March 20, 1967     2 Sheets-Sheet 2
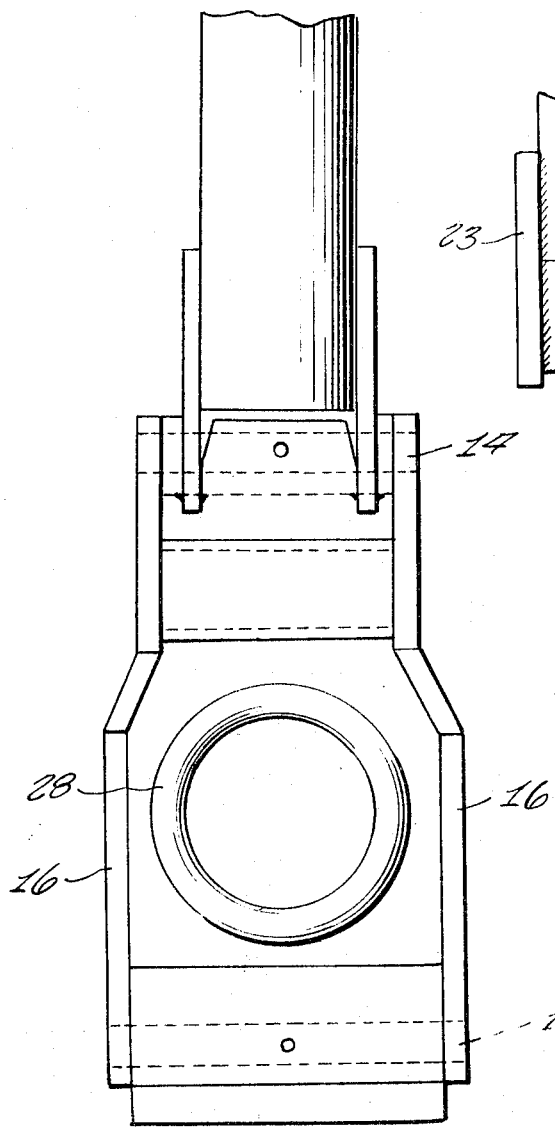
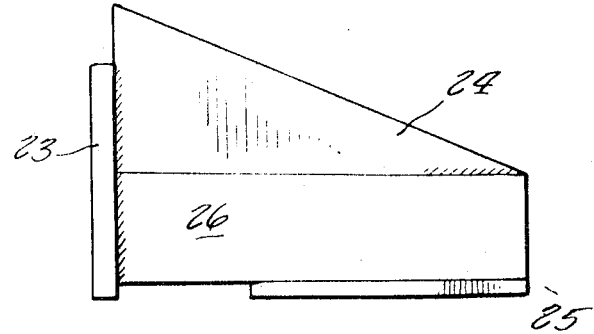
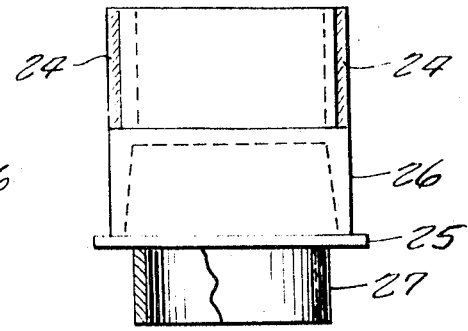
INVENTOR
EARL L. BAILEY .United States Patent Office 3,459,438
Patented Aug. 5, 1969

3,459,438
COIL SPRING AND LEVER ACTION AXLE
ASSEMBLY
Earl L. Bailey, 1708 Freeman, Toledo, Ohio 43606
Filed Mar. 20, 1967, Ser. No. 624,341
Int. Cl. B60g 17/00, 11/14
U.S. Cl. 280—124                                1 Claim

ABSTRACT OF THE DISCLOSURE

An axle assembly including each spindle being supported between two ends of a pair of parallel levers, the opposite ends of the levers being pivotably secured to a rigid part of the automobile frame so that the spindle is at all times parallel with the road surface, and the axle assembly including a compression coil spring bearing at its lower end against one of the parallel levers and its upper end against a rigid part of the vehicle frame, and the axle assembly further including a limiting bolt to keep the spring from rebounding should there be any.

---

This invention relates to generally automotive axle assemblies.

A principal object of the present invention is to provide an improved automobile axle assembly including a compression spring and which is designed to be particularly adapted for boat trailers and having the novel feature of eliminating any problem of whipping of the trailer.

Another object of the present invention is to provide an improved axle assembly for a boat trailer which includes a wheel spindle being mounted pivotably free between the ends of two parallel levers, the levers at their opposite ends being mounted pivotably free to a rigid part of the chassis or frame.

Another object of the present invention is to provide an improved axle assembly including a compression coil spring having a lower end bearing against one of the parallel levers and the opposite end of the spring bearing against a rigid part of the chassis or frame.

Yet another object of the present invention is to provide an improved axle assembly wherein a limiting bolt is included to keep the compression spring from rebounding should any such action occur.

Other objects of the present invention are to provide a coil spring and lever action which is simple in design, inexpensive to manufacture, rugged in construction, easy to use and efficient in operation.

These and other objects will be readily evident upon a study of the following specifications and accompanying drawings wherein;

FIGURE 1 is a side elevation view of an axle assembly incorporating the present invention, FIGURE 2 is a side elevation view of a detail of the present invention comprising a bolt that is passed through an opening and having a flat ground on one side for allowing grease to pass thereby, FIGURE 3 is a top plan view of the present invention, FIGURE 4 is a side elevation view of the top spring bracket shown in FIGURE 1, FIGURE 5 is an end elevation view of the spring bracket shown partly in cross-section.

Referring now to the drawings in detail, the reference numeral 10 represents an improved axle assembly according to the present invention wherein there is a wheel spindle 11 that is rigidly affixed at one end to a link 12, the link having openings 13 at its opposite ends for being mounted pivotably free upon pins 14 secured within the ends 15 of a pair of parallel levers 16. The opposite ends of the levers 16 are provided with openings for being mounted pivotably free on pins 18 carried in vertically spaced apart relation upon bracket 19 secured to a rigid part of the chassis frame 20, as is shown in FIGURE 1 of the drawing. The chassis frame is shown to include a horizontally extending channel 21 having a fender post 22 at one end thereof, the channel 21 carrying the bracket 19.

A plate 23 is welded to the frame 20, the plate 23 having a gusset 24 welded thereto, the gusset 24 carrying a horizontal plate 25 and channel 26, the plate 25 having a short pipe 27 welded to the underside thereof.

The pipe 27 is inserted into one end of a compression coil spring 28, as shown in FIGURE 1.

A plate 29 secured to a gusset 30 is carried by the lower most of the parallel levers 16, the plate 29 compressing a spring pad for the lower end of the compression coil spring 28. It is to be understood that the pad 29 may also include, if preferred, a relatively short pipe 31 which is receivable within the lower end of the compression coil spring in a manner similar to the pipe 27.

It is to be understood that suitable bearings comprising bushings 32 may be provided at each end of the parallel levers 16, and zerk fittings may be provided for the bearings for purpose of lubrication of the same as shown at 33.

As is shown in FIGURE 2 of the drawing, a bolt 34 is provided having a flat 35 ground along one side 36 thereof. A flat piece of metal spot is welded near the bolt head that goes through the bent bars to hold the bolt in place. The flat 35 upon the bolt 34 faces a zerk fitting for the purpose of allowing grease to get therearound for purpose of lubricating the mechanism.

It is to be understood that the various parts may be made according to conventional machine shop practice and the parts designed to meet the requirements of strength. Thus the link 12 may be formed of channel construction, and the pins 14 and 18 may be provided with threaded ends having self-locking nuts secured upon. Accordingly it is understood that the drawings merely indicate the principles of the present construction and not the refinements of practical construction.

In operative use, it would be readily understood that the wheel spindle 11 will remain at all times parallel with the road surface 37 due to the action of the parallel levers 16 each of which is of equal length between the openings 13. The compression coil springs 28 will normally urge downwardly against the lever assembly. A limit bolt 38 is located concentrically within the coil spring 28 for the purpose of keeping the spring from rebounding should any such occur.

While various changes may be made in the detailed construction it is understood that such changes will be within the spirit and scope of the present invention as is defined by the appended claim.

I claim:

1. In an improved axle assembly, the combination of a wheel spindle, said wheel spindle being secured rigidly to a link at one end, said link extending transversely to said spindle in a vertical direction while said spindle extends horizontally, the opposite ends of said link being secured pivotally free upon a pair of pins, said pins being secured to one end of each of a pair of parallel levers, and the opposite end of said levers being secured pivotally free to pins secured to a bracket mounted upon a chassis frame of a boat trailer vehicle, said parallel levers being equal in length between said pins at the opposite ends of said levers so as to maintain said wheel spindle parallel at all times to a road surface, a top bracket being secured to said chassis frame, said top bracket having a relatively short length of pipe secured thereto in a downwardly extending direction, said pipe being inserted into the upper end of a compression coil spring, the lower end of said compression coil spring being supported upon a lower spring pad secured to a lower of said levers, a limit bolt extending centrally through said compression coil spring and retained by said top bracket and lower spring pad, said limit bolt providing a means to keep said spring from rebound, and each of said pins in the ends of said parallel levers comprising a bolt having a flat along a central portion thereof in abutment with a zerk fitting for receiving grease to lubricate said pin.

References Cited

UNITED STATES PATENTS

| 903,080 | 11/1908 | Granieri | 267—20 |
|---|---|---|---|
| 2,039,671 | 5/1936 | Wagner | 267—20 |
| 2,090,141 | 8/1937 | Newton | 267—20 |
| 2,152,938 | 4/1939 | Welch | 267—20 |
| 2,567,594 | 9/1951 | Bruhn | 267—20 |
| 2,886,312 | 5/1959 | Freiermuth | 267—20 |

FOREIGN PATENTS 798,752    3/1936    France.

PHILIP GOODMAN, Primary Examiner

U.S. Cl. X.R.

267—20; 280—96